(12) United States Patent
Pant et al.

(10) Patent No.: US 12,533,439 B2
(45) Date of Patent: Jan. 27, 2026

(54) ANTIBACTERIAL WOUND TREATMENTS WITH CLOT-PROMOTING PROPERTIES

(71) Applicant: University of Georgia Research Foundation, Inc., Athens, GA (US)

(72) Inventors: Jitendra Pant, Athens, GA (US); Dieu Thao Nguyen, Dalton, GA (US); Hitesh Handa, Athens, GA (US)

(73) Assignee: UNIVERSITY OF GEORGIA RESEARCH FOUNDATION, INC., Athens, GA (US)

(*) Notice: Subject to any disclaimer, the term of this patent is extended or adjusted under 35 U.S.C. 154(b) by 1191 days.

(21) Appl. No.: 17/433,731

(22) PCT Filed: Feb. 25, 2020

(86) PCT No.: PCT/US2020/019701
§ 371 (c)(1),
(2) Date: Aug. 25, 2021

(87) PCT Pub. No.: WO2020/176507
PCT Pub. Date: Sep. 3, 2020

(65) Prior Publication Data
US 2022/0143262 A1    May 12, 2022

Related U.S. Application Data

(60) Provisional application No. 62/810,634, filed on Feb. 26, 2019.

(51) Int. Cl.
*A61L 15/40* (2006.01)
*A61L 15/46* (2006.01)
*A61L 26/00* (2006.01)

(52) U.S. Cl.
CPC .............. *A61L 15/40* (2013.01); *A61L 15/46* (2013.01); *A61L 26/0057* (2013.01); *A61L 26/0066* (2013.01); *A61L 2300/404* (2013.01); *A61L 2300/418* (2013.01); *A61L 2400/04* (2013.01)

(58) Field of Classification Search
None
See application file for complete search history.

(56) References Cited

U.S. PATENT DOCUMENTS

| | | | |
|---|---|---|---|
| 8,642,831 B2 | 2/2014 | Larsen et al. | |
| 9,044,527 B2 | 6/2015 | Neas et al. | |
| 2009/0081279 A1* | 3/2009 | Jezek | A61P 17/02 424/94.4 |
| 2018/0214598 A1* | 8/2018 | Stasko | A61L 15/425 |

FOREIGN PATENT DOCUMENTS

| | | |
|---|---|---|
| CN | 102695528 A | 9/2012 |
| WO | 20060955193 A2 | 9/2006 |
| WO | 2016201237 A1 | 12/2016 |
| WO | 20160201237 | 12/2016 |

OTHER PUBLICATIONS

Oryan et al (Biomedicine & Pharmacotherapy, 98, 2018, 469-483). (Year: 2018).*
Binkowska, A. M.; Michalak, G.; Słotwiński, R., Current views on the mechanisms of immune responses to trauma and Infection. Central-European journal of immunology 2015, 40 (2), 206.
Hozzein, W. N.; Badr, G.; Al Ghamdi, A. A.; Sayed, A.; Al-Waili, N. S.; Garraud, O., Topical application of propolis enhances cutaneous wound healing by promoting TGF-beta/Smad-mediated collagen production in a streptozotocin-induced type I diabetic mouse model. Cellular Physiology and Biochemistry 2015, 37 (3), 940-954.
Mello, C.; Petrus, J.; Hubinger, M., Nanofiltration of aqueous propolis extracts and the effects of temperature, pressure and ph in the concentrated product. Stud Chem Technol (SCPT) 2013, 1, 55-65.
Uzel, A.; Önçağ, Ö.; çoğulu, D.; Gençay, Ö., Chemical compositions and antimicrobial activities of four different Anatolian propolis samples. Microbiological research 2005, 160 (2), 189-195.
Rahman, M. M.; Richardson, A.; Sofian-Azirun, M., Antibacterial activity of propolis and honey against *Staphylococcus aureus* and *Escherichia coli*. African Journal of Microbiology Research 2010, 4 (18), 1872-1878.
Grenho, L.; Barros, J.; Ferreira, C.; Santos, V.; Monteiro, F.; Ferraz, M.; Cortes, M., In vitro antimicrobial activity and biocompatibility of propolis containing nanohydroxyapatite. Biomedical Materials 2015, 10 (2), 025004.
Pant, J.; Goudie, M. J.; Chaji, S. M.; Johnson, B. W.; Handa, H., Nitric oxide releasing vascular catheters for eradicating bacterial infection. Journal of Biomedical Materials Research Part B: Applied Biomaterials.
Pant, J.; Goudie, M. J.; Hopkins, S. P.; Brisbois, E. J.; Handa, H., Tunable Nitric Oxide Release from S-Nitroso-N-acetylpenicillamine via Catalytic Copper Nanoparticles for Biomedical Applications. ACS Appl. Mater. Interfaces 2017, 9 (18), 15254-15264.
Pant, J.; Goudie, M.; Brisbois, E.; Handa, H., Nitric oxide-releasing polyurethanes. Advances in Polyurethane Biomaterials 2016, 417.
Pant, J.; Gao, J.; Goudie, M. J.; Hopkins, S.; Locklin, J.; Handa, H., A Multi-defense Strategy: Enhancing Bactericidal Activity of a Medical Grade Polymer with a Nitric Oxide Donor and Surface-immobilized Quaternary Ammonium Compound. Acta Biomater. 2017.

(Continued)

*Primary Examiner* — Celeste A Roney
(74) *Attorney, Agent, or Firm* — Thomas | Horstemeyer, LLP

(57) ABSTRACT

Wound dressings and methods for treating a wound are provided. The wound dressing can have an environment-facing side that includes a biocompatible material having a polymer crosslinked with an antimicrobial effective amount of a NO-donor and a woundfacing side including a biocompatible resinous matrix and an antifibrinolytic agent. The wound dressing can promote fibrin formation and rapid platelet aggregation, and has antimicrobial properties. The dressing can be applied directly to the wound.

10 Claims, 8 Drawing Sheets

(56) References Cited

OTHER PUBLICATIONS

Jones, A.; Pant, J.; Lee, E.; Goudie, M. J.; Gruzd, A.; Mansfield, J.; Mandal, A.; Sharma, S.; Handa, H., Nitric oxide-releasing antibacterial albumin plastic for biomedical applications. Journal of Biomedical Materials Research Part A.

Grommersch, B. M.; Pant, J.; Hopkins, S. P.; Goudie, M. J.; Handa, H., Biotemplated Synthesis and Characterization of Mesoporous Nitric Oxide-Releasing Diatomaceous Earth Silica Particles. ACS Appl. Mater. Interfaces 2018, 10 (3), 2291-2301.

Sundaram, J.; Pant, J.; Goudie, M. J.; Mani, S.; Handa, H., Antimicrobial and physicochemical characterization of biodegradable, nitric oxide-releasing nanocellulose-chitosan packaging membranes. J. Agric. Food Chem. 2016, 64 (25), 5260-5266.

Goudie, M. J.; Brisbois, E. J.; Pant, J.; Thompson, A.; Potkay, J. A.; Handa, H., Characterization of an S-nitroso-N-acetylpenicillamine-based nitric oxide releasing polymer from a translational perspective. Int. J. Polym. Mater. Polym. Biomater. 2016, 65 (15), 769-778.

Brisbois, E. J.; Bayliss, J.; Wu, J.; Major, T. C.; Xi, C.; Wang, S. C.; Bartlett, R. H.; Handa, H.; Meyerhoff, M. E., Optimized polymeric film-based nitric oxide delivery inhibits bacterial growth in a mouse burn wound model. Acta Biomater. 2014, 10 (10), 4136-4142.

Zahed, R.; Moharamzadeh, P.; AlizadehArasi, S.; Ghasemi, A.; Saeedi, M., A new and rapid method for epistaxis treatment using injectable form of tranexamic acid topically: a randomized controlled trial. The American journal of emergency medicine 2013, 31 (9), 1389-1392.

Pant, "Antibacterial Instant Clot Forming Bioinspired Wound Dressing for Traumatic Injuries", Apr. 14, 2018 (Apr. 14, 2018), Iris 2018 Integrative Research & Ideas Symposium, University of Georgia, retrieved on Apr. 25, 2020 from https :/ /static1 .squarespace .comlstatic/5 7bb4aca03596effbb 7 4e6121/5acecef503ce64b9a46df3ca/ 1523502838706/IRIS+2018+Program+-+Corrected.pdf, entire document, especially p. 14 para 1.

Wikipedia, "Resin", Oct. 15, 2018 (Oct. 15, 2018), retrieved on Apr. 25, 2020 from https:/len .wikipedia.org/wlindex.php?title=Resin &oldid=864163405; entire document, especially p. 1 para 1.

International Search Report for PCT/US2020/019701 mailed May 20, 2020.

International Preliminary Report on Patentability for PCT/US2020/ 019701 mailed Aug. 25, 2021.

Office Action dated Sep. 29, 2023 in co-pending Canadian Patent Application No. 3,131,379.

International Search Report and Written Opinion mailed May 20, 2020 for International Application No. PCT/US2020/19701.

Pant, "Antibacterial Instant Clot Forming Bioinspired Wound Dressing for Traumatic Injuries", Apr. 2018, Iris 2018 Integrative Research & Ideas Symposium, University of Georgia.

Wikipedia, "Resin", Oct. 15, 2018 (Oct. 15, 2018), retrieved on Apr. 25, 2020 from https://en.wikipedia.org/w/index.php?title=Resin &oldid=864163405; entire document, especially p. 1 para 1.

\* cited by examiner

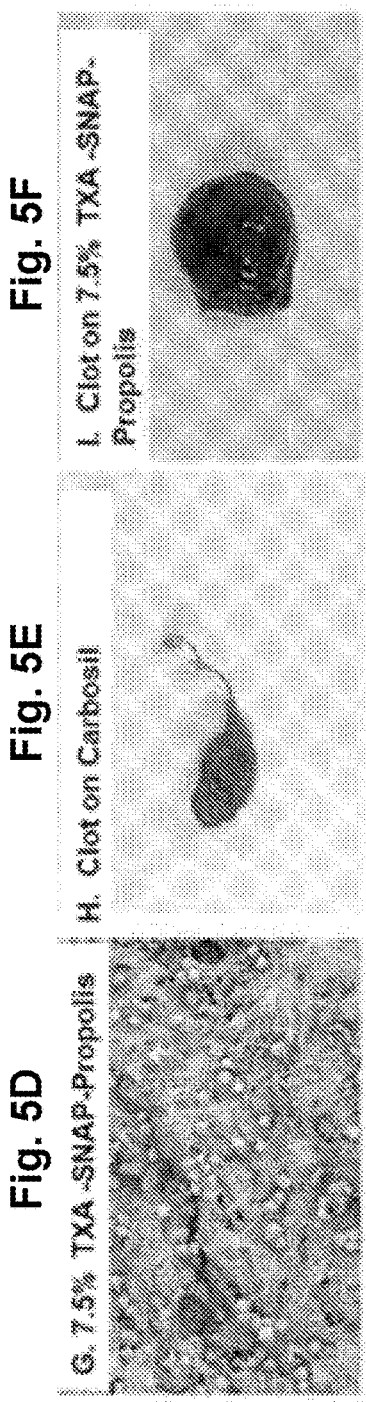
Fig. 5A A. Carbosil
Fig. 5B B. SNAP
Fig. 5C C. Propolis
Fig. 5D D. SNAP-Propolis
Fig. 5E E. 2.5% TXA-SNAP-Propolis
Fig. 5F F. 5% TXA-SNAP-Propolis
Fig. 5G G. 7.5% TXA-SNAP-Propolis
Fig. 5H H. Clot on Carbosil
Fig. 5I I. Clot on 7.5% TXA-SNAP-Propolis

ANTIBACTERIAL WOUND TREATMENTS WITH CLOT-PROMOTING PROPERTIES

CROSS-REFERENCE TO RELATED APPLICATIONS

This application is a National Stage of International Application No. PCT/US2020/019701, filed Feb. 25, 2020 having the title "ANTIBACTERIAL WOUND TREATMENTS WITH CLOT-PROMOTING PROPERTIES," which claims the benefit of and priority to U.S. Provisional Application Ser. No. 62/810,634, having the title "ANTIBACTERIAL WOUND TREATMENTS WITH CLOT-PROMOTING PROPERTIES", filed on Feb. 26, 2019, the disclosure of which is incorporated herein by reference in its entirety.

STATEMENT REGARDING FEDERALLY SPONSORED RESEARCH OR DEVELOPMENT

This invention was made with government support under Grant No. AG055393 awarded by the NIH. The Government has certain rights in the invention. (37 CFR 401.14 f (4))

BACKGROUND

Traumatic injuries range from automobile accidents to gunshots, shrapnel, and any injuries that require immediate attention and care. Every year, more than 5 million deaths happen globally due to trauma injuries. Uncontrollable hemorrhages and lacerations, the common aftermath of trauma, are the primary causes of deaths within the first 6 hours and 4 hours, respectively, among patients who are admitted into medical facilities. Uncontrollable hemorrhages contribute to approximately 50% of deaths in the first couple of days amongst both civilian and military soldiers. Excessive blood loss is responsible for nearly 30% of deaths after traumatic injuries. Infection is another leading cause of fatalities in trauma patients; indeed, it has become the second most common cause of death in patients who have experienced trauma more than 72 hours prior. Wounded sites that have not been properly treated are at a higher risk of infections. When the immune system concentrates on maintaining homeostasis while anti-inflammatory mediators focus on inhibiting the inflammation of the wounded area(s), the diversion of attention results in constant exposure of the wounded area to pathogens. This, therefore, impedes the process of wound healing while simultaneously increasing the immune disorder that can potentially cause multiple organ failures. Currently available wound dressings with antibiotics and silver ions are toxic to bacteria but at the same time are cytotoxic to mammalian cells, which is highly undesirable. There remains a need for wound dressings that overcome the aforementioned deficiencies.

BRIEF DESCRIPTION OF THE DRAWINGS

Further aspects of the present disclosure will be readily appreciated upon review of the detailed description of its various embodiments, described below, when taken in conjunction with the accompanying drawings.

(FIG. 4A) 12 mins (FIG. 4B) 60 min.

FIGS. 5A-5I provide scanning electron microscopy and real-time images of fibrin networks, platelet entrapment, and clot formation.

DETAILED DESCRIPTION

Figure 1:
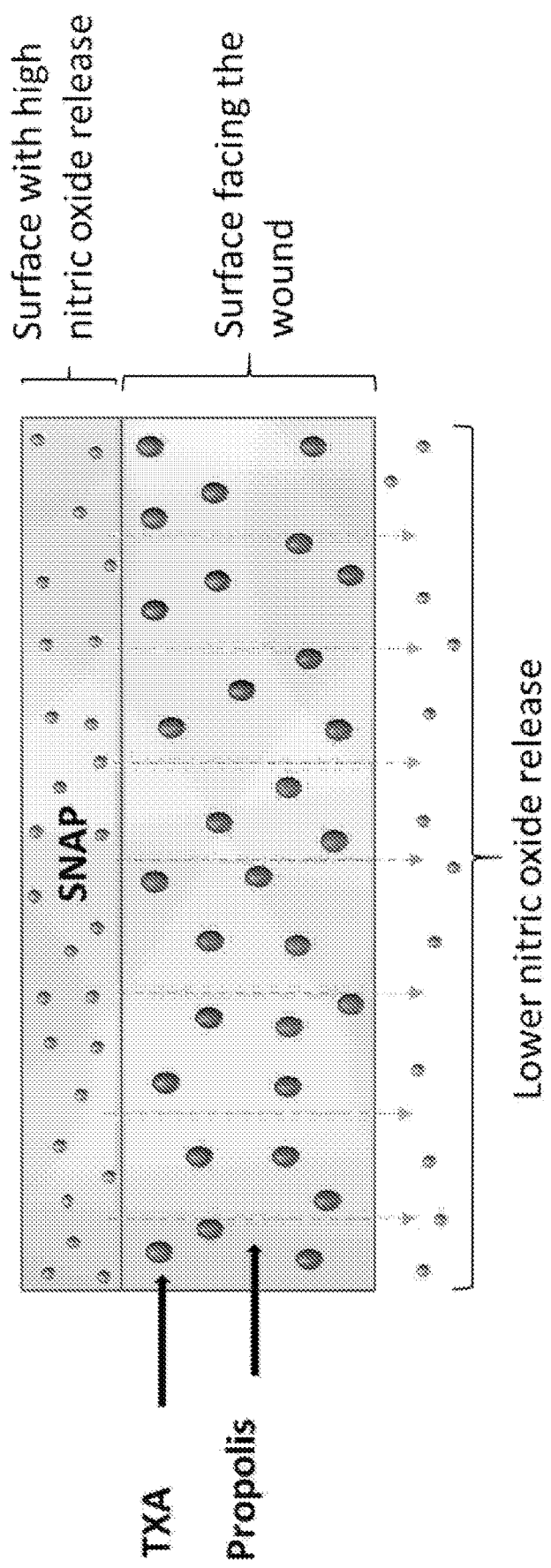
FIG. 1 is a schematic diagram showing an embodiment of the composition of instant clot forming and antibacterial wound dressing.

In various aspects, the present disclosure provides for wound healing treatments and wound dressings with wound healing properties.

In an embodiment, the present disclosure provides for wound dressings including a resinous matrix and an antifibrinolytic agent. In embodiments the dressing has an environment-facing side and a wound-facing side. The wound-facing side includes the resinous matrix and the antifibrinolytic agent. The environment-facing side can include a biocompatible material having a polymer cross-linked with an antimicrobial effective amount of a NO-donor.

In various embodiments, the dressing promotes fibrin formation, rapid platelet aggregation, and has antimicrobial properties without being cytotoxic. Advantageously, the wound treatments and dressings described herein can promote clot formation within about about 60 min. or less, about 1 min. to 60 min., about 5 min. to 30 min., about 5 min. to 15 min. and inhibit bacteria at the wound site. The promotion of fibrin formation as used herein refers to a faster rate of fibrin formation in comparison to control dressings. Similarly, the platelet aggregation rate and bacterial inhibition is in comparison to control dressings that do not include an anti-fibrinolytic agent or the resinous matrix described herein.

In various embodiments, the resinous matrix is and/or includes propolis. Advantageously, not only does propolis contribute to anti-inflammatory/antibacterial properties of the treatment, the addition of propolis to the material surface increases the degree of platelet adhesion and boosts the antibacterial properties of the NO-donor. In embodiments, the resinous matrix can also be honey or a combination of honey and propolis. The resinous matrix can act as a resinous glue that can carry the antifibrinolytic agent or hold the antifibrinolytic agent together.

In various embodiments, the resinous matrix can further include a NO-donor. Viscosity of the resinous matrix can help in slowing down NO release until the clot is formed. Since NO is also anti-thrombic in nature, a slow NO response on the wound-facing side is desirable in first few minutes of application.

According to embodiments of the disclosure, the antifibrinolytic agent can be tranexamic acid (TXA). TXA promotes fibrin formation, which is important for clotting. TXA has been used successfully via intravenous or oral delivery for prevention of and/or reduction of blood loss perioperatively or during traumatic events. However, it has not been previously used in wound dressings. In various embodiments, the concentration of TXA can be about 2% to 10%, about 2.5% to 7.5%, or about 7.5%.

Other antifibrinolytic agents, such as aminocaproic, can be used or included.

In embodiments, the NO-donor can be, but is not limited to S-nitroso-N-acetylpenicillamine (SNAP). In other embodiments, the NO-donor can be a RSNO (e.g. S-Nitrosoglutathione (GSNO), S-nitrosocysteamine, S-nitrosocysteine, S-nitroso-N-acetyl cysteamine, S-nitroso-N-acetyl cysteine, S-n itrosothioglycolate methyl S-nitrosothioglycolate) or other NO donors such as sodium nitroprusside, or any diazonium diolate (DBHD). The NO-donor can be a combination of NO-donors. In various embodiments, a NO-donor included in the resinous matrix can be the same or different from a NO-donor included in the environment-facing side of the wound dressing.

The polymer can include synthetic polymers (e.g. thermoplastic silicone-polycarbonate-urethane (CarboSil®), polyvinyl alcohol, polyurethane) and/or natural polymers (e.g. sodium alginate, chitosan, cellulose, collagen, chondroitin, gelatin, silk fibroin, eggshell membrane, albumin, wheat bran, arabinoxylan) and combinations thereof. The NO-donor can be crosslinked to the polymer, resulting in a film having antimicrobial properties.

An embodiment of the present disclosure includes a wound dressing that includes a mixture of a resinous matrix as above and an antifibrinolytic agent applied directly to the wound.

In an embodiment, the present disclosure provides for methods of treating a wound, including applying a mixture of a resinous matrix and an antifibrinolytic agent applied directly to the wound. The mixture can promote fibrin formation and rapid platelet aggregation and has antimicrobial properties.

In some embodiments, the mixture can be included in a wound dressing applied to the wound.

As can be envisioned by one of skill in the art, the wound treatments and dressings described herein can also be combined with other dressings (e.g. absorbent dressings such as gauze pads, wound fillers/packings, hydrogel or silicon sheets, elastic bandages, dressings containing silver, alginates, foams, etc.).

Before the present disclosure is described in greater detail, it is to be understood that this disclosure is not limited to particular embodiments described, and as such may, of course, vary. It is also to be understood that the terminology used herein is for the purpose of describing particular embodiments only and is not intended to be limiting. The skilled artisan will recognize many variants and adaptations of the embodiments described herein. These variants and adaptations are intended to be included in the teachings of this disclosure.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

As used herein, the following terms have the meanings ascribed to them unless specified otherwise. In this disclosure, "consisting essentially of" or "consists essentially" or the like, when applied to methods and compositions encompassed by the present disclosure refers to compositions like those disclosed herein, but which may contain additional structural groups, composition components or method steps (or analogs or derivatives thereof as discussed above). Such additional structural groups, composition components or method steps, etc., however, do not materially affect the basic and novel characteristic(s) of the compositions or methods, compared to those of the corresponding compositions or methods disclosed herein. "Consisting essentially of" or "consists essentially" or the like, when applied to methods and compositions encompassed by the present disclosure have the meaning ascribed in U.S. Patent law and the term is open-ended, allowing for the presence of more than that which is recited so long as basic or novel characteristics of that which is recited is not changed by the presence of more than that which is recited, but excludes prior art embodiments.

In some instances, units may be used herein that are non-metric or non-SI units. Such units may be, for instance, in U.S. Customary Measures, e.g., as set forth by the National Institute of Standards and Technology, Department of Commerce, United States of America in publications such as NIST HB 44, NIST HB 133, NIST SP 811, NIST SP 1038, NBS Miscellaneous Publication 214, and the like. The units in U.S. Customary Measures are understood to include equivalent dimensions in metric and other units (e.g., a dimension disclosed as "1 inch" is intended to mean an equivalent dimension of "2.5 cm"; a unit disclosed as "1 pcf" is intended to mean an equivalent dimension of 0.157 kN/m$^3$; or a unit disclosed 100° F. is intended to mean an equivalent dimension of 37.8° C.; and the like) as understood by a person of ordinary skill in the art.

Definitions

Abbreviations used in the present disclosure include the following: NO, nitric oxide; SNAP, S-nitroso-N-acetylpenicillamine; TXA, tranexamic acid; EDTA, ethylenediamine tetraacetic acid; NaOH, sodium hydroxide; CarboSil® 20 80A thermoplastic silicone—polycarbonate-urethane (hereafter will be referred to as CarboSil®); THF, tetrahydrofuran; EDTA, ethylenediaminetetraacetic acid; NBS, N-Bromosuccinimide; PBS, Phosphate buffered saline; ATCC, American Type Tissue Collection.

As used herein, the term "antithrombotic" refers to anticoagulants or agents having the effect of reducing the formation of blood clots.

The term "antifibrinolytic" refers to a drug capable of inhibiting the activation of plasminogen to plasmin or an agent capable of preventing the break-up of fibrin and thereby maintaining clot stability.

The terms "antimicrobial" and "antimicrobial characteristic" refers to the ability to kill and/or inhibit the growth of microorganisms. A substance having an antimicrobial characteristic may be harmful to microorganisms (e.g., bacteria, fungi, protozoans, algae, and the like). A substance having an antimicrobial characteristic can kill the microorganism, reduce the quantity or virulence of the microorganism, and/or prevent or substantially prevent the growth or reproduction of the microorganism. The term antibacterial is also encompassed within this definition.

The terms "bacteria" or "bacterium" include, but are not limited to, Gram positive and Gram negative bacteria. Bacteria can include, but are not limited to, *Abiotrophia, Achromobacter, Acidaminococcus, Acidovorax, Acinetobacter, Actinobacillus, Actinobaculum, Actinomadura, Actinomyces, Aerococcus, Aeromonas, Afipia, Agrobacterium, Alcaligenes, Alloiococcus, Alteromonas, Amycolata, Amycolatopsis, Anaerobospirillum, Anabaena affinis* and other cyanobacteria (including the *Anabaena, Anabaenopsis, Aphanizomenon, Camesiphon, Cylindrospermopsis, Gloeobacter Hapalosiphon, Lyngbya, Microcystis, Nodularia, Nostoc, Phormidium, Planktothrix, Pseudoanabaena, Schizothrix, Spirulina, Trichodesmium,* and *Umezakia* genera) *Anaerorhabdus, Arachnia, Arcanobacterium, Arcobacter, Arthrobacter, Atopobium, Aureobacterium, Bacteroides, Balneatrix, Bartonella, Bergeyella, Bifidobacterium, Bilophila Branhamella, Borrelia, Bordetella, Brachyspira, Brevibacillus, Brevibacterium, Brevundimonas, Brucella, Burkholderia, Buttiauxella, Butyrivibrio, Calymmatobacterium, Campylobacter, Capnocytophaga, Cardiobacterium, Catonella, Cedecea, Cellulomonas, Centipeda, Chlamydia, Chlamydophila, Chromobacterium, Chyseobacterium, Chryseomonas, Citrobacter, Clostridium, Collinsella, Comamonas, Corynebacterium, Coxiella, Cryptobacterium, Delftia, Dermabacter, Dermatophilus, Desulfomonas, Desulfovibrio, Dialister, Dichelobacter, Dolosicoccus, Dolosigranulum, Edwardsiella, Eggerthella, Ehrlichia, Eikenella, Empedobacter, Enterobacter, Enterococcus, Erwinia, Erysipelothrix, Escherichia, Eubacterium, Ewingella, Exiguobacterium, Facklamia, Filifactor, Flavimonas, Flavobacterium, Francisella, Fusobacterium, Gardnerella, Gemella, Globicatella, Gordona, Haemophilus, Hafnia, Helicobacter, Helococcus, Holdemania Ignavigranum, Johnsonella, Kingella, Klebsiella, Kocuria, Koserella, Kurthia, Kytococcus, Lactobacillus, Lactococcus, Lautropia, Leclercia, Legionella, Leminorella, Leptospira, Leptotrichia, Leuconostoc, Listeria, Listonella, Megasphaera, Methylobacterium, Microbacterium, Micrococcus, Mitsuokella, Mobiluncus, Moellerella, Moraxella, Morganella, Mycobacterium, Mycoplasma, Myroides, Neisseria, Nocardia, Nocardiopsis, Ochrobactrum, Oeskovia, Oligella, Orientia, Paenibacillus, Pantoea, Parachlamydia, Pasteurella, Pediococcus, Peptococcus, Peptostreptococcus, Photobacterium, Photorhabdus, Phytoplasma, Plesiomonas, Porphyrimonas, Prevotella, Propionibacterium, Proteus, Providencia, Pseudomonas, Pseudonocardia, Pseudoramibacter, Psychrobacter, Rahnella, Ralstonia, Rhodococcus, Rickettsia Rochalimaea Roseomonas, Rothia, Ruminococcus, Salmonella, Selenomonas, Serpulina, Serratia, Shewenella, Shigella, Simkania, Slackia, Sphingobacterium, Sphingomonas, Spirillum, Spiroplasma, Staphylococcus, Stenotrophomonas, Stomatococcus, Streptobacillus, Streptococcus, Streptomyces, Succinivibrio, Sutterella, Suttonella, Tatumella, Tissierella, Trabulsiella, Treponema, Tropheryma, Tsakamurella, Turicella, Ureaplasma, Vagococcus, Veillonella, Vibrio, Weeksella, Wolinella, Xanthomonas, Xenorhabdus, Yersinia,* and *Yokenella*. Other examples of bacterium include *Mycobacterium tuberculosis, M. bovis, M. typhimurium, M. bovis* strain BCG, BCG substrains, *M. avium, M. intracellulare, M. africanum, M. kansasii, M. marinum, M. ulcerans, M. avium* subspecies paratuberculosis, *Staphylococcus aureus, Staphylococcus epidermidis, Staphylococcus equi, Streptococcus pyogenes, Streptococcus agalactiae, Listeria monocytogenes, Listeria ivanovii, Bacillus anthracis, B. subtilis, Nocardia asteroides,* and other *Nocardia* species, *Streptococcus viridans* group, Peptococcus species, *Peptostreptococcus* species, *Actinomyces israelii* and other *Actinomyces* species, and *Propionibacterium acnes, Clostridium tetani, Clostridium botulinum,* other *Clostridium* species, *Pseudomonas aeruginosa,* other *Pseudomonas* species, *Campylobacter* species, *Vibrio cholera, Ehrlichia* species, *Actinobacillus pleuropneumoniae, Pasteurella haemolytica, Pasteurella multocida,* other *Pasteurella* species, *Legionella pneumophila,* other *Legionella* species, *Salmonella typhi,* other *Salmonella* species, *Shigella* species *Brucella abortus,* other *Brucella* species, *Chlamydi trachomatis, Chlamydia psittaci, Coxiella burnetti, Escherichia coli, Neiserria meningitidis, Neiserria gonorrhea, Haemophilus influenzae, Haemophilus ducreyi,* other Hemophilus species, *Yersinia pestis, Yersinia enterolitica,* other *Yersinia* species, *Escherichia coli,* E. hirae and other *Escherichia* species, as well as other Enterobacteria, *Brucella abortus* and other *Brucella* species, *Burkholderia cepacia, Burkholderia pseudomallei, Francisella tularensis, Bacteroides fragilis, Fudobascterium nucleatum,* Provetella species, and *Cowdria ruminantium,* or any strain or variant thereof. The Gram-positive bacteria may include, but is not limited to, Gram positive Cocci (e.g., *Streptococcus, Staphylococcus,* and *Enterococcus*). The Gram-negative bacteria may include, but is not limited to, Gram negative rods (e.g., Bacteroidaceae, Enterobacteriaceae, Vibrionaceae, Pasteurellae and Pseudomonadaceae). In an embodiment, the bacteria can include *Mycoplasma pneumoniae*.

The term "antimicrobial effective amount" as used herein refers to that amount of the compound being administered/released which will kill microorganisms and/or inhibit growth and/or reproduction thereof to some extent (e.g. from about 5% to about 100%). In reference to the compositions or articles of the disclosure, an antimicrobial effective amount refers to that amount which has the effect of diminishment of the presence of existing microorganisms, stabilization (e.g., not increasing) of the number of microorganisms present, preventing the presence of additional microorganisms, delaying or slowing of the reproduction of microorganisms, and combinations thereof. Similarly, the term "antibacterial effective amount" refers to that amount of a compound being administered/released that will kill bacterial organisms and/or inhibit growth and/or reproduction thereof to some extent (e.g., from about 5% to about 100%). In reference to the compositions or articles of the disclosure, an antibacterial effective amount refers to that amount which has the effect of diminishment of the presence of existing bacteria, stabilization (e.g., not increasing) of the number of bacteria present, preventing the presence of additional bacteria, delaying or slowing of the reproduction of bacteria, and combinations thereof.

The terms "broad-spectrum biocide", "biocide", and "biocidal" as used herein include, without limitation, pesticides (e.g. fungicides, herbicides, insecticides, algicides, molluscicides, miticides, and rodenticides) and antimicrobials as defined above and may also include germicides, antibiotics, antibacterials, antivirals, antifungals, antiprotozoals, and antiparasites.

As used herein the term "biocompatible" refers to the ability to co-exist with a living biological substance and/or biological system (e.g., a cell, cellular components, living tissue, organ, etc.) without exerting undue stress, toxicity, or adverse effects on the biological substance or system.

As used herein, "propolis" refers to a product composed of a resinous mixture of saliva, beeswax and tree secretions, commonly known as "bee glue".

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Introduction

The present disclosure describes embodiments of wound dressings with the ability to induce rapid clot formation and bacterial inhibition and, in some embodiments, eradication at the wound site. The active materials of this exemplary wound dressing are propolis, tranexamic acid (TXA), and a nitric oxide donor, S-nitroso-N-acetylpenicillamine (SNAP). All the active ingredients were integrated into CarboSil®, a copolymer of polyurethane and silicone. This complex of SNAP, propolis, TXA and CarboSil® is intricate in several manners. Propolis acts as the boundary layer as it allows both SNAP and TXA to flourish and accomplish their primary functions. This boundary layer promotes SNAP's antibacterial effect while simultaneously limiting its interference with clot formation. TXA is then able to reinforce and heighten clot formation by reducing the breakdown of fibrin and preserving the already formed platelets matrix from destruction caused by the physiological pathways. Scanning electron microscopy (SEM) and lactate dehydrogenase (LDH) based platelet adhesion assay validated the rapid (nearly instant) clot formation in a 15-minute study with porcine whole blood and platelet extract in vitro. The antibacterial activity of the bioinspired wound dressing resulted in a 99.3% reduction in colony forming units/cm$^2$ of *Acinetobacter baumannii*, which is among the most common bacteria associated with wounds. The dressing showed no cytotoxic response when tested on smooth muscle cells and mouse fibroblast cells in vitro. Overall, the wound TXA-SNAP-Propolis wound dressing demonstrated the ability to extend the critical time window before hospitalization.

In the present disclosure, wound dressings have been fabricated with the potential to impel nearly instant blood clot formation while simultaneously preventing infection at the wound site. The active materials of this embodiment of the wound dressing described in the present example included FDA-approved tranexamic acid (TXA) in combination with propolis and S-nitroso-N-acetylpenicillamine (SNAP), a nitric oxide donor. CarboSil®, a biomedical grade co-polymer of polyurethane and silicone (thermoplastic silicone-polycarbonate-urethane) was used as the base polymer matrix that held all the active ingredients. Each of the active agents played a role in optimizing the efficacy of the wound dressing to promote instant clot while inhibiting infection at the wound site.

Nitric oxide has a variety of influences on the physiological and pathological pathways and is known to play a key role in all four phases of wound healing: hemostasis, inflammation (prevention of infection), cell proliferation, and tissue remodeling. A coat of propolis was applied to the side facing the wound. Propolis is a natural product composed of a resinous mixture of saliva, beeswax and tree secretions. It is commonly known as "bee glue" and has been extensively studied for its anti-inflammatory, antioxidant, and antimicrobial properties. [5-6] Topical application of propolis has accelerated wound healing due to its anti-inflammatory properties allowing the body to focus primarily on repairing the wounded site. According to numerous studies, propolis is an antimicrobial agent, against common pathogens on infected wounds. [7-9] These characteristics give propolis an advantage over synthetic compounds as it poses less risk to the human body, and its natural origin makes it a compelling agent to combat antimicrobial-resistant bacteria.

In the case of hemorrhage, the focus is to establish hemostasis by stabilizing the blood clot. An antifibrinolytic is used to reduce the breakdown of the clot. A widely used antifibrinolytic is tranexamic acid (TXA). TXA is a synthetic derivative of the amino acid lysine and a competitive inhibitor that inhibits hyperfibrinolysis by blocking the lysine binding site on the plasminogen and thus prevents the conversion of plasminogen to plasmin.[10] This process results in the inhibition of clot lysis and restores clot stabilization. TXA is injected or infused into a patient in trauma or preoperative scenarios. Oral formulations are also used in the treatment of heavy menstrual cycles and for dental procedures. However, heretofore, TXA has had no known topical applications. In the present example, TXA was added to the sticky bed of propolis to stabilize the clot.

Thermoplastic silicone-polycarbonate-urethane (Carbo-Sil®), because of its intrinsic biocompatibility, tensile strength and chemical stability, was used as the base polymer to which other components were integrated. The integration was achieved through physical blending of Propolis and TXA that were spread over the Carbosil-SNAP films.

This biocompatible material possesses the strength to prevent wear and tear while simultaneously providing the external pressure needed to reduce excessive bleeding.

This complex of SNAP, propolis, TXA and CarboSil® is intricate in several manners. The far exterior of the wound dressing facing the outside environment contains a layer of CarboSil® infused with SNAP. This integration provides a slow release of NO and combats any foreign microbial from entering and adhering on and inside the wound. The second layer fabricates an amalgam of TXA and propolis and directly interacts with the wound site. This arrangement permits propolis to have a direct interaction with the wound and allows antibacterial characteristics to prevent bacterial adhesion and biofilm formation. Propolis also acts as the boundary layer as it allows both SNAP and TXA to flourish and accomplish their primary functions. This boundary layer promotes SNAP's antibacterial effect in the outer layer while simultaneously slowing release of SNAP on the wound-facing surface and thereby limiting its interference with clot formation. TXA is then able to reinforce and heighten clot formation without any disturbances from SNAP. While propolis tackles the issues of infection, TXA on the other hand, targets the risk of excessive bleeding.

The study described herein validates the antibacterial and instant clot forming ability of SNAP-Propolis-TXA wound dressings via characterization in terms of antibacterial activity, instant clot-forming ability, and cytocompatibility of the wound dressings.

Experimental Section 2.1 Materials

Tranexamic acid (TXA) 98% purity was purchased from Apexbio Technology LLC (Houston, TX). 70% Ultra Strength Propolis was bought from Y. S. Organic Bee Farms (Sheridan, IL). Thermoplastic silicone-polycarbonate-urethane (CarboSil® 20 80A UR STPU) was obtained from DSM Biomedical Inc. (Berkeley, CA). Tetrahydrofuran (THF) anhydrous, >99%, inhibitor-free, calcium chloride, sodium salts of alginic acid, ethylenediaminetetraacetic acid (EDTA), and sodium chloride were obtained from Sigma-Aldrich (St. Louis, MO). LB broth and LB Agar were bought from Fisher Bioreagents (Fair Lawn, NJ). Dulbecco's Modification of Eagle's medium (DMEM) and trypsin-EDTA were purchased from Corning (Manassas, VA). The Cell Counting Kit-8 (CCK-8) was obtained from Sigma-Aldrich (St Louis, MO). The antibiotic Penicillin-Streptomycin (Pen-Strep) and fetal bovine serum (FBS) were purchased from Gibco-Life Technologies (Grand Island, NY 14072). L-Glutathione (reduced 98+%) was purchased from Alfa Aesar (Ward Hill, MA). The bacterial *Acinetobacter baumannii* (ATCC 19606) and Mouse fibroblast cell line (ATCC 1658) were originally obtained from American Tissue Culture Collection (ATCC) (Manassas, VA). Autoclaved Phosphate buffered saline (PBS, pH 7.4), was used for all in vitro experiments.

Methods

The objective is to fabricate a novel wound dressing that can endure high stress and possess elastic characteristics. Enclosed in this wound dressing is the main component, SNAP, an antimicrobial agent. On the outer surface is a gloss of propolis and TXA mixture, providing a natural antimicrobial element and exposing an antifibrinolytic agent to the wounded area to induce platelet adhesion. The SNAP concentration was 10 wt % based on past studies that warrants NO release in physiological range.[11-12]

Fabrication of Wound Dressing

Nitric oxide plays an important role in wound healing due to its pivotal role in all four phases of wound healing. However, NO also possesses antithrombic properties. Once a clot is formed, however, the presence of NO can't dissolve it. Thus SNAP-Propolis-TXA wound dressing of this example was designed to have two unique surfaces. The surface that comes in direct contact with the wound had a suspension of propolis and TXA, while the side exposed to the environment had SNAP integration. Collectively, each composition and layer operates to promote antibacterial properties via the SNAP layer on the exterior and a propolis inner portion of the wound dressing to control the wound's vulnerability to pathogens. Propolis also acts as the boundary layer as it allows both SNAP and TXA to flourish and accomplish their primary functions. This boundary layer can promote SNAP's antibacterial effect while simultaneously limiting NO interference with clot formation by slowing down the NO release. TXA is then able to reinforce and heighten clot formation without any disturbances from SNAP. The step-wise fabrication of the wound dressing is discussed below.

SNAP blending in CarboSil®. The fabrication process of the CarboSil®-SNAP composite was obtained from a previously published report (Pant et al., Advances in Polyurethane Biomaterials 2016 and Pant et al., ACS Appl. Mater. Interfaces 2017, each of which are hereby incorporated by reference).[12-13] Initially, CarboSil® was uniformly dissolved in THF in a glass vial using a magnetic stirrer giving the final concentration of 50 mg/ml. Literature has recorded an effective SNAP concentration to be approximately 10 wt % to obtain physiologically relevant NO release.[11-12, 14] Subsequently, 10 wt % SNAP was added to the mixture and was further dissolved. Afterward, 3 ml of solution was cast into a mold and left to dry overnight at room temperature, allowing excess THF to evaporate. The CarboSil®-SNAP films were fashioned into a circular shape using a hole-punch with 8 mm diameter.[5] Each piece of wound dressing was then top coated with an additional layer of CarboSil® (50 mg/ml) and left to dry overnight to evaporate any traces of THF.

Propolis and TXA coatings. The concentration of propolis and TXA were based on previously published reports that were modified for this work.[3,5] In recent medical studies, a 5-10% concentration of TXA was given to patients to reduce bleeding.[15-17] Therefore, the concentrations of TXA of 2.5%, 5.0%, and 7.5% were tested for clot forming and stabilizing properties. 20 µL of propolis was spread on one side of the dressing which served as the inner side of the dressing (facing the wound). A schematic showing an example composition of the wound dressing is presented in FIG. 1.

2.2.2 NO Release Study Using Nitric Oxide Analyzer (NOA)

The NO release study was performed to investigate the NO flux from the wound dressing using a Sievers chemiluminescence Nitric Oxide Analyzer (NOA) 280i (Boulder, CO). The NOA has the capability to selectively map NO via the reaction of NO with ozone, thereby reducing intervention from other molecules.[34] The dressings were wrapped in wipes (Kimwipes, KIMTECH) and submerged in PBS (pH 7.4) containing EDTA to mimic a moist wound environment prior to using them for NO flux analysis. After being submerged, the film was immediately placed at the bottom of the sample holder. Nitric oxide was continuously purged from the sample and swept from the headspace using nitrogen as the sweep gas into the chemiluminescence detection chamber. This setup was then lowered into a water bath which was maintained at 37° C. The films were tested for short-term NO release at approximately 1 hour, keeping the trauma injuries application in mind.

2.2.3 Real-Time Fibrin Formation

The degree of fibrin formation (clot progression) was measured via optical turbidity using a Biotek 96 well plate reader.[18-19] The wound dressings (88 mm) were adhered to the walls of the 96 well plate. 200 μL of citrated platelet-poor plasma was added to each well, and baseline absorbance values were recorded. Clot initiation was then achieved by reversal of the anticoagulant by addition of $CaCl_2$ to the platelet-poor plasma and absorbance at 405 nm was recorded over a 120 min period at 37° C.

2.2.4 Assessment of Platelet Adhesion In Vitro

Porcine blood was purchased from Lampire Biological. The anticoagulated blood was centrifuged at 1100 rpm for 12 min using the Eppendorf Centrifuge 5702. The platelet-rich plasma (PRP) portion was collected carefully with a pipet as to not disturb the buffy coat. The remaining samples were then centrifuged again at 4000 rpm for 20 min to achieve platelet poor plasma (PPP). Total platelet count in both the PRP and PPP fractions were determined using a hemocytometer (Fisher). The PRP and PPP were combined in a ratio to give a final platelet concentration of ca. $2 \times 10^8$ platelets $ml^{-1}$. Calcium chloride (30 μL/ml PRP, 200 mM) was added to the final platelet solution to reverse the effects of the anticoagulant immediately before the 15 min incubation period.

Films of each test material (5/16" D, n=4) were placed in individual 5 ml blood tubes (VWR) containing 4 ml of platelet-rich plasma. Samples were incubated at 37° C. for 15 min with mild rocking (25 rpm) on a Medicus Health blood tube rocker. Following the incubation, the films were gently washed with normal saline to remove any loosely bound platelets and transferred to a 1 ml vial containing 2% v/v Triton-X100 in PBS for 30 min.

The degree of platelet adhesion was determined using the lactate dehydrogenase (LDH) released when the adherent platelets were lysed with the Triton-PBS buffer using a Roche Cytotoxicity Detection Kit (LDH) per the manufacturer's instructions. Briefly, 100 μL of the detection kit reagent solution and 100 μL of the test sample Triton-X/PBS solution were added per well and allowed to react for 20 min protected from light. Following the reaction time, absorbance was measured at 492 and 620 nm. Measurements from each sample were conducted in duplicate. A calibration curve was constructed using known dilutions of the final PRP, and the platelet adhesion on the various tubing samples was determined from the calibration curve.

2.2.5 Whole Blood Exposure and Surface Electron Microscopy (SEM)

Once materials were exposed for 15 min, the samples, along with the clots, were gently removed from the blood. The clots in the samples were photographed (digital camera) and then gently rinsed with saline buffer. The rinsed samples (containing clots+material) were then soaked in 3% glutaraldehyde for 4 days to allow complete fixation of the biomass. Once fixed, samples were dehydrated using increasing concentrations of ethanol for 20 min each (50, 60, 70, 80, 90, and 100%). The samples were then immediately transferred to a 2:1 ratio solution of 100% ethanol: Hexamethyldisilazane (HDMS). After 20 min, these samples were then transferred to and soaked in 1:2 ratio of 100% ethanol: HMDS for 20 min. Finally, samples were transferred to 100% HMDS and allowed to dry overnight in the fume hood. The dried samples were then sputter coated (Leica sputter coater) in 10 nm thickness of gold-palladium for SEM imaging. The imaging was conducted using an FEI Teneo (FEI Co.). The SEM was employed at an accelerating voltage of 4.00 kV to examine the micron scale structure of the blood clots formed.

2.2.6 Eradication of Adhered Bacteria

Open wounds are prone to infection from the soil, water, and airborne pathogens. Infection at the wound site is a major concern as it slows down the overall wound healing process. Therefore, an antibacterial attribute of a wound dressing is an important parameter. To test the antibacterial ability of the designed wound dressing, a standard bacterial inhibition test was carried out in the presence of *Acinetobacter baumannii* (*A. baumannii*), a soil-borne bacteria prevalent in war-fields. Recommended protocol based on a previous report was used for bacterial culture.[12, 14] A single colony forming a unit (CFU) of bacterium was separately inoculated in 10 ml of LB broth at 37° C. and 120 rpm for 14 hours. Afterward, the optical density (OD) of bacterial culture was measured at 600 nm via UV-vis spectrophotometer (Thermo Scientific Genesys 10S UV-Vis). The culture was centrifuged for 7 minutes at 2500 rpm and thereafter, the supernatant was discarded, and fresh PBS of an equal amount was added, and the centrifuging process was repeated twice to remove any residue of PBS containing LB broth residue. This provides a static environment and isotonic medium where bacterial cells can stay alive for 24 hours without proliferating. An additional OD measurement was taken, and the bacterial culture was diluted to the desired concentration of $10^{-6}$-$10^{-8}$ CFU/ml which corresponds to bacterial load at the site of infection. Thereafter, bacteria were transferred to a well plate containing 2 ml of bacteria in each of the wells. Wound dressings were then incubated into a 2 ml bacteria culture for 24 hours at 37° C. (n=3 per dressing type). Subsequently, after the 24-hour study, the wound dressings were retrieved and rinsed with fresh PBS and placed in a 1 ml tube containing fresh PBS. Individual samples were vortexed for approximately 30 seconds to remove any bacteria loosely adhered to the wound dressing. The bacterial suspension was serially diluted in the range of $10^{-1}$-$10^{-5}$ dilution factor and henceforth plated on Petri dishes containing LB agar medium and incubated at 37° C. for 24 hours. After incubation, colony forming unit per weight of wound dressing (CFU/mg) data were collected and compared with the control wound dressings that contained either SNAP, propolis or neither. The data analysis allows for the assessment of the efficacy of SNAP and propolis as antibacterial agents. Furthermore, the percentage of bacterial inhibition was calculated with the following formula.

$$\% \text{ Bacterial inhibition} = \frac{\left(\frac{CFU}{cm^2} \text{ in control samples} - \frac{CFU}{cm^2} \text{ in test samples}\right) * 100}{\frac{CFU}{cm^2} \text{ in control samples}}$$

2.1.6 Analyzing Cytotoxicity Effect of the Wound Dressing

As per the ISO 10993 standards, the purpose of performing biocompatibility testing on a biomaterial is to investigate its undesirable effects such as cytotoxicity. It is often the leachates from the biomaterials that can cause toxic effects and inflammation in the localized area. To ensure that the leached-out agents of the wound dressing material do not kill the healthy host cells, cytotoxicity testing in accordance with ISO 10993 was conducted on 3T3 mouse fibroblast cells using cell counting kit-8 (CCK-8) assay. The manufacturer's (Sigma-Aldrich) protocol was followed while using CCK-8 kit which utilizes highly water-soluble tetrazolium salt. In the live cells, WST-8 [2-(2-methoxy-4-nitrophenyl)-3-(4-nitrophenyl)-5-(2,4-disulfophenyl)-2H-tetrazolium monosodium salt] is reduced by dehydrogenases to give formazan (an orange-colored product), which can be detected at 450 nm. This means that a noncytotoxic material should generate a higher level of formazan than a relatively cytotoxic material because of WST-8 reduction. To obtain the leachate, samples weighing 10 mg each were added to 10 ml to in the DMEM medium for 24 hours at 37° C. The leachate was later used to grow the cells.

Seeding of cells. A culture of the fibroblast cells was grown in a 75 cm2 T-flask with Dulbecco modified Eagle's medium (DMEM) with 4.5 g/L-glutamine, 4.5 g/L glucose, 1% penicillin-streptomycin and 10% fetal bovine serum (FBS) after thawing a cryopreserved vial of fibroblast cells.[11] The cells could proliferate in an incubator which provided a physiological condition for their growth (5% CO2, 37° C.) until the confluence reached around 80-90%. The cells were detached from the T-flask surface by enzymatically degrading their extracellular matrix layer by treating them with 0.18% trypsin and 5 mM EDTA for 5 min. The formula below was used to calculate cell viability.[12]

$$\text{Cell Viability (\%)} = \frac{\text{Absorbance of the test samples}}{\text{Absorbance of the control samples}} * 100$$

Results and Discussion

3.1 NO Release Kinetics

Figure 2:
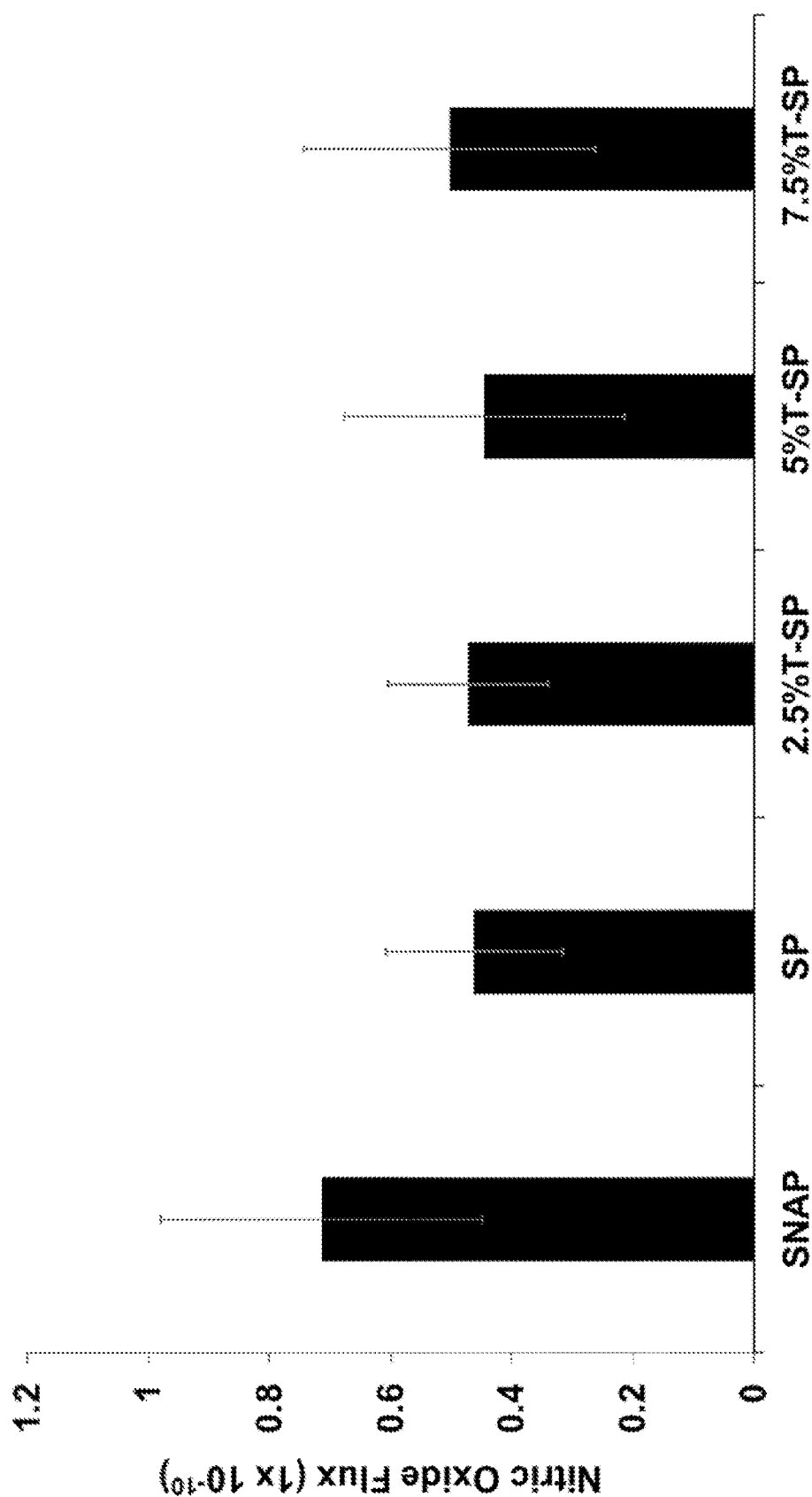
FIG. 2 shows NO flux released from wound dressings containing NO donor, SNAP in a 1-hour period.

CarboSil®'s unique composition and matrix formation allows for the controlled and localized release of NO from SNAP over an extended period. Past reports have shown that SNAP tends to crystallize locally within multiple sites in CarboSil® that allows sustained release of NO. Due to its low water retention, CarboSil® also prevents leaching of SNAP that could otherwise have undesirable consequences. The NO release study was conducted for of the following samples: (i) Control sample that contained solely SNAP, (ii) CarboSil® composite containing SNAP and a layer of propolis, (iii) CarboSil® composite containing both SNAP and propolis with varied level of TXA at 2.5%, 5.0%, and 7.5%, respectively. As expected, the wound dressing that contained an additional coat of propolis yield a lower NO release ($5\text{-}5.5 \times 10^{-11}$ mol cm$^{-2}$ min$^{-1}$) than the wound dressing containing the SNAP alone ($7 \times 10^{-11}$ mol cm$^{-2}$ min$^{-1}$). FIG. 2 shows the comparative NO release from various CarboSil®-SNAP samples with and without propolis and TXA.

Even though CarboSil®-SNAP has a higher level of NO release, which is desirable from the wound dressing's antibacterial perspective, a higher level of NO release can also prevent clot formation. The objective was to have an optimal level of NO release to reduce the bacteria adhesion both on the wound and above it, without inhibiting platelet adhesion.

3.2 Platelet Adhesion

Figure 3:
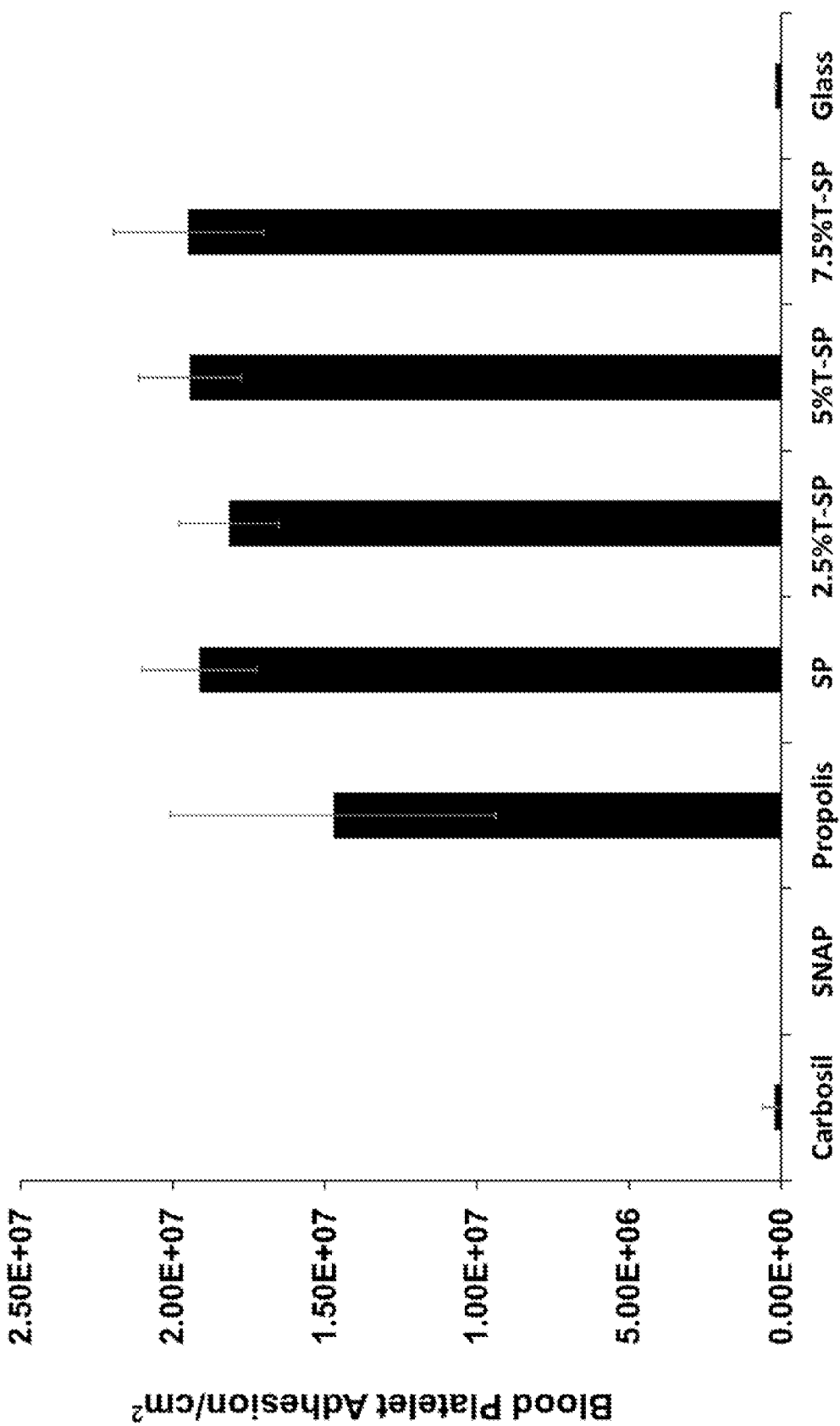
FIG. 3 provides a comparison of platelet adhesion activity of the wound dressing with or without propolis, TXA, SNAP, and various combinations thereof.

Platelets are one of the main components of blood that plays an important role in blood clot formation and hence, blood loss by promoting cell adhesion and aggregation. Upon activation, platelets change their shape which allows them to adhere to the walls of the blood vessels, forming a dense plug that is networked tightly by fibrin. Eventually, the mass of platelets and fibrin fibrils can hold plasma and red blood cells, helping to increase the thrombus area at the wound site. The active substances released by intracellular granules in platelets, including polyphosphates and adenosine diphosphate, contribute to hemostasis at the site of injury.[20] Therefore, platelet adhesion is a major parameter that defines the formation of a potential wound clot in vitro. In the present study, the ability for the wound dressings to promote clotting was also investigated in platelet-rich plasma to assure that while NO release would be capable of providing bactericidal activity, the levels of NO release were low enough to not prevent gross inhibition of platelets in contact with the surface. Interestingly, the addition of propolis to the material surface significantly increased the degree of platelet adhesion for both NO-releasing and non-NO-releasing configurations ($p=2\times10^{-8}$, $p=0.00018$) as shown in FIG. 3. This also opens the room for the possibility that propolis has clot forming ability. Having control over the release of NO has promoted antibacterial and wound healing effects and reduced the interference NO can have on the clotting process. Similarly, the addition of TXA aided in the rate of fibrin formation. Overall, it was confirmed that the addition of propolis to SNAP-CarboSil® increased the degree of platelet adhesion, even with NO-releasing surfaces while TXA increased the overall rate of fibrin formation.

3.3 Real-Time Fibrin Formation

Figure 4A:
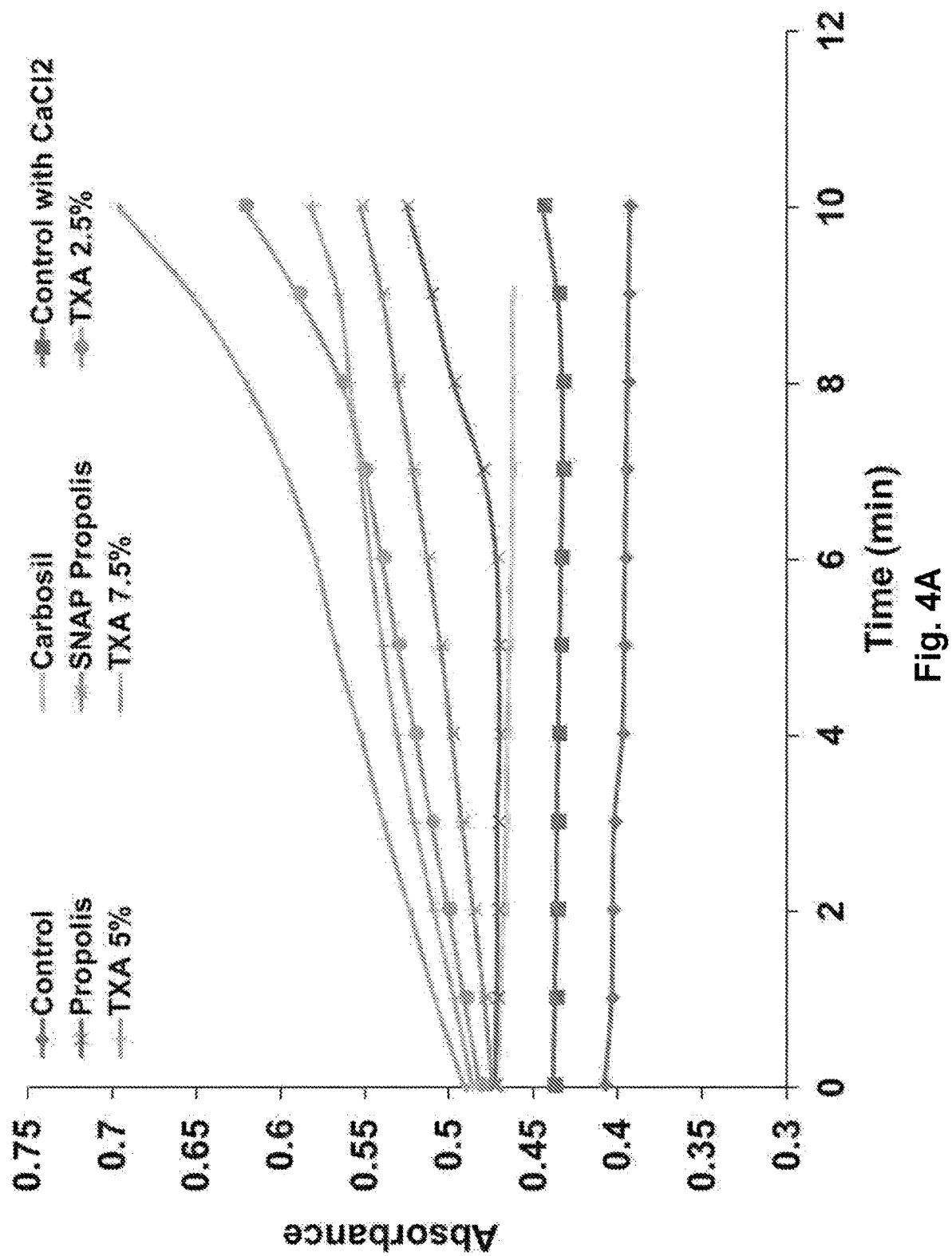
FIGS. 4A-4B show real time fibrin activation at different time points.
Figure 4B:
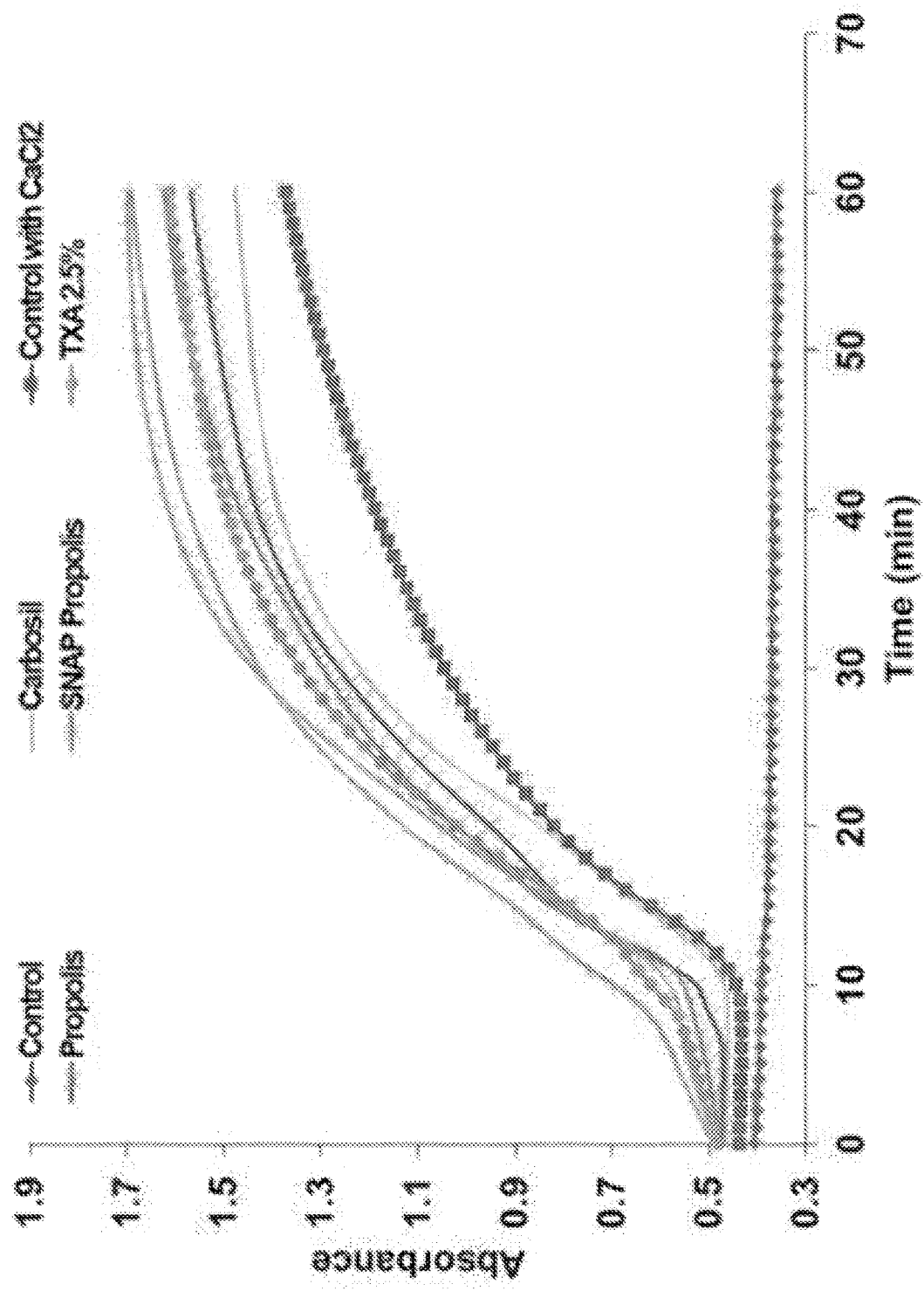

Hemostasis, the process to halt the bleeding, is achieved through the aggregation of platelets to the wound site and in parallel, the progress of the coagulation cascade through several clotting factors, ultimately converting fibrinogen to fibrin.[21] This is possible when a stable fibrin network forms at the site of the wound which prevents further breakdown of clots and re-bleeding of the wound and acts as a temporary extracellular matrix for the wound site to promote tissue repair. Fibrin is a non-globular and fibrous protein responsible for clotting at the wound site. The activity of enzyme protease on fibrinogen results in the polymerization of fibrin which together with platelets form a clot at the wound site. Thus, the study of real-time fibrin formation in vitro can give important clues if wound clot would potentially have formed. In the current work, the fibrin inducing activity of the SNAP-TXA-Propolis was investigated using a plasma clot assay similar to that reported by Brash et al.[18] In this assay, the various test materials (n=7) were incubated in citrated platelet poor plasma (PPP) (platelet count<$10^6$ platelets/ml) followed by the addition of $Ca^{+2}$ ions to initiate the coagulation process. Fibrin formation depends on the activation of prothrombin to thrombin and occurs on the surface of activated platelets. Clot formation was monitored by following the change in turbidity of the plasma using a Biotek plate reader with absorbance measurements at 405 nm every 1 min over 60 min (FIGS. 4A-4B). Plasma without the addition of calcium was used as a negative control, along with re-calcified plasma in uncoated wells. The initial 10 min was examined to determine the rate of fibrin formation by taking the slope of the absorbance curve, where the 10 min mark was chosen arbitrarily to access instant clotting potential as the time the control re-calcified plasma began to have noticeable fibrin formation (FIG. 4A). Films containing TXA all demonstrated increased rates of fibrin formation. Propolis and SNAP-propolis behaved much more closely to the native CarboSil® control.

At the 60 min mark, films containing TXA also demonstrated higher final absorbance, indicating a denser fibrin network (FIG. 4B). These results provide supporting evidence that these dressings, when applied to human wounds, would cause clotting to occur as early as 10 minutes and the clot will continue to mature in first one hour. Furthermore, the presence of NO did not lead to fibrinolysis. The key lies in the fact that even though NO is known to inhibit platelet adhesion, it cannot break down blood clots that have already been formed. This further confirms that the dual surfaces of the wound dressings are effective in achieving the clot formation by propolis-TXA even in the presence of NO. Extrapolation of these results in real-life scenario points to the conclusion that the designed wound dressings have instant clotting effect that would improve further with time.

3.4 Fibrin Networking, Platelet Entrapment and Clot Formation Observed Via SEM and Real-Time During an injury, the damaged blood vessels lead to activation of platelets that releases chemicals that cause fibrin mesh formation. Eventually, red blood cells are entrapped in the mesh network forming a blood clot. In the current study, the wound dressings are designed to achieve clot formation in the first few minutes of the injury. Therefore, fibrin networking and platelet entrapment were observed 15 minutes after the bringing the wound dressing in contact with the blood using Scanning Electron Microscopy (SEM).

As observed via SEM imaging, platelet aggregation and thinner-densely formed fibrin webs showed better and stable thrombus (FIGS. 5A-5I). While a certain degree of platelet aggregation was observed on control CarboSil® samples and the CarboSil®-SNAP samples, these samples didn't show any significant fibrin networking. However, with propolis-TXA a higher amount of fibrin network was observed in samples that also aided in more platelet entrapment also when compared with control or SNAP samples. Even though NO, which can prevent platelet adhesion at the very first step and prevent the cascade reaction of fibrin networking and clot formation, this nitric oxide release was not significantly high enough to completely block the clotting cascade. After addition of propolis and TXA to the CarboSil®-SNAP dressings, thrombus became more prominently stable with an increase in fibrin network along with platelet aggregation. As discussed earlier, TXA is an antifibrinolytic agent that helped stabilize the clot. As the figure demonstrates, the clot fibrin network became denser with increasing concentration of TXA. Interestingly, with 7.5% TXA, there was not just an increase in fibrin networking but also an increase in the number of platelets around the fibrin network. This can be attributed to the re-enforcement of platelets from its surroundings during the thrombus formation.

In the past, TXA has been used as a crucial therapeutic strategy to control excessive bleeding that led to saving a lot of lives. In 2012, the publication of the CRASH-2 trials found that TXA experimentation on trauma injuries demonstrated a significant reduction in all-cause mortality. The CRASH-2 trials reported a 32% reduction in deaths when TXA was administered within 1 hour of injury.[22] However, none of the previous trials or studies applied TXA topically. The implementation of TXA could potentially prevent 128,000 deaths worldwide if TXA were issued within 1 hour of the injury, and 112,000 deaths if patients were to receive it within 3 hours of the injury.[23] A great number of clinical trials have reported no evidence of increased risk with the use of TXA. The average cost of TXA is approximately $5.70/g which is particularly advantageous for these wound dressings from the translational perspective.[22]

Besides providing an adhesive matrix that holds TXA, propolis would allow easy application to the wound site. Interestingly, when used by itself (without SNAP and or TXA) and compared to control CarboSil®, an increase in platelet aggregation was observed. However, fibrin networking was not enhanced significantly by propolis alone (FIG. 5A vs 5C). This can be due to the sticky nature of propolis, which enhanced localized attachment of platelets due to adhesive forces. Propolis-SNAP (without TXA) samples also showed an increase in platelet adhesion, when compared with CarboSil®-SNAP (FIG. 5B vs 5D). This is due to the decrease in NO flux as propolis acted as a shield on the surface of the dressing, hindering the NO release.

To test whether the materials fabricated would form stable thrombus structures within minutes of contact between the wound site with free-flowing blood and the TXA-propolis-SNAP wound dressings, a blood clot formation test was also performed in addition to SEM imaging. In this test, a porcine blood sample was incubated for 15 min with the test materials at room temperature. After exposure to the blood for a short amount of time, the materials, along with the clots formed, were photographed (FIGS. 5H-5I). As obvious from the real-clot images, the blood clot with 7.5% TXA was not only bigger but also more stable (no loose ends of clots) than the clot formed on control CarboSil® surface as apparent from the thinning of the blood clot with loose blood around the cot.

These results provide proof of concept to confirm the antifibrinolytic activity of TXA is not affected by SNAP and it is enhanced by the adhesive properties of propolis. However, future studies in vivo can confirm the ability of the wound dressing in animals and human models.

3.5 Antibacterial Efficacy of Wound Dressing

Figure 6:
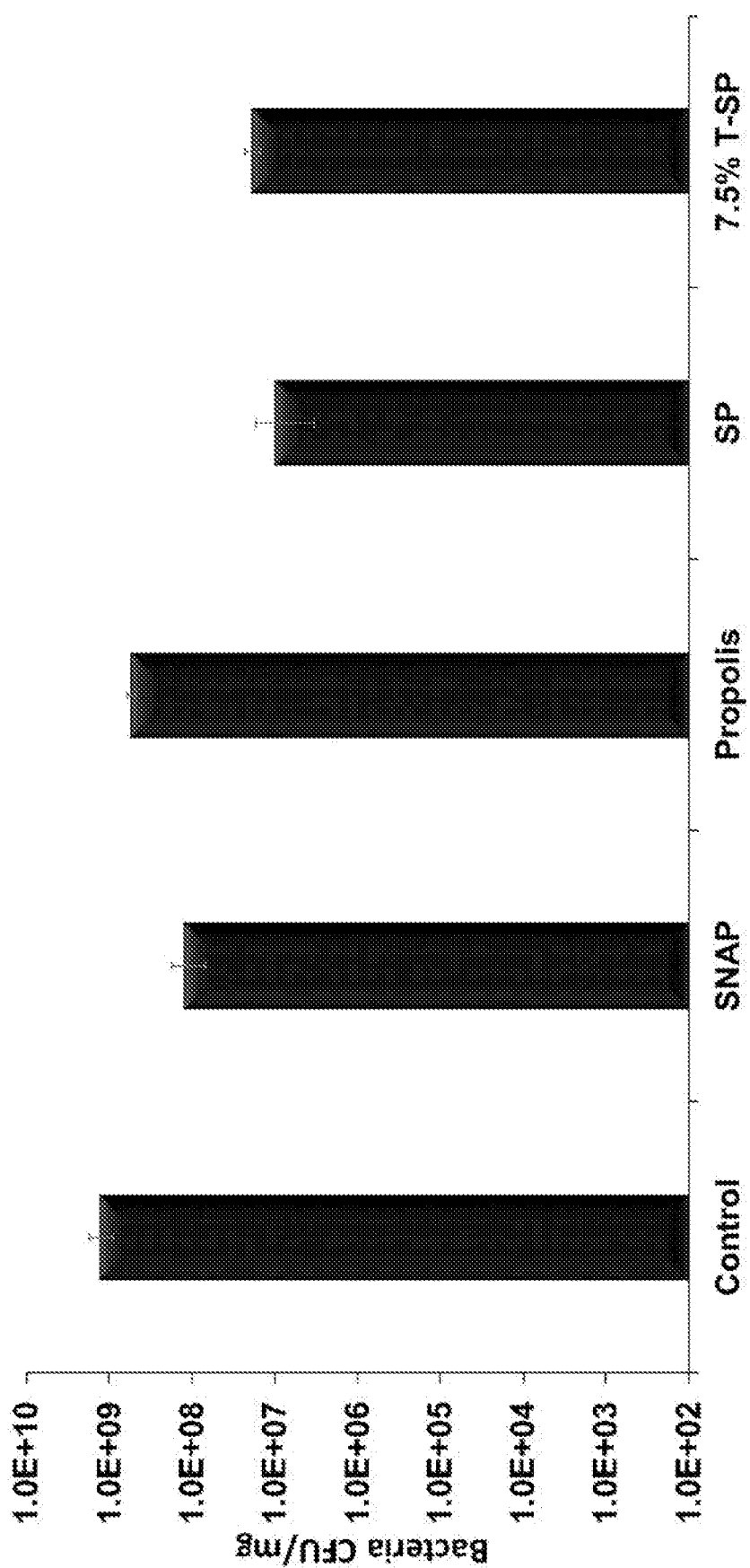
FIG. 6 shows a bacterial adhesion assay displaying up to more than 2 log reduction by an embodiment of a composition of the present disclosure with 7.5% TXA-SNAP-propolis.

Open wounds are prone to infection from the soil, water, and airborne pathogens. Infection at the wound site is a major concern as it slows down the overall wound healing process. Therefore, an antibacterial attribute of a wound dressing is an important parameter. To test the antibacterial ability of the designed wound dressing, a standard bacterial inhibition test was carried out in the presence of *Acinetobacter baumannii* (*A. baumannii*), a soil borne bacteria prevalent in war-fields. Recommended protocol based on a previous report was used for bacterial culture.[12, 14] Integrating both SNAP and propolis in the wound dressing augmented the antibacterial properties of the fabricated wound dressing. SNAP is a widely used NO donor with antibacterial characteristics that has been incorporated into biomedical grade polymers and drug vehicles to reduce biofilm formation and bacterial adhesion on the surface, taking great measure to prevent infection.[11-14, 24-25] From the real-time fibrin formation, LDH adhesion and SEM result, it was clear that SNAP-propolis wound dressings with 7.5% TXA resulted in maximum clot formation. Therefore, further bacteria study was carried out with 7.5% TXA-SNAP-propolis wound dressings. A comparative study was performed between control CarboSil®, SNAP-CarboSil®, CarboSil®-Propolis, SNAP-propolis and 7.5% TXA-SNAP-propolis. As shown in FIG. 6, SNAP-propolis and 7.5% TXA-SNAP-propolis resulted in greater than 2 log reductions as compared to CarboSil® alone. In terms of percentage this accounts to >99% bacteria killing. From these results, it is evident that even though the layer of propolis and TXA prevents the full release of NO towards the wound side, enough NO is able to penetrate through the resinous layer and act upon bacteria attempting to adhere on the surface. Ultimately, the presence of NO reduces the bacteria adhesion both on the wound and above it, without inhibiting platelet adhesion, and therefore, neither objective has been compromised. In the past, different studies have shown NO based strategy to be effective against wide variety of bacteria thus making it useful for different biomedical applications.[11-13, 26] However, in the present study, it was not just NO but also propolis that aided in the antibacterial effect. Propolis was introduced to the wound dressing matrix due to its glue action and sticky properties. Unexpectedly, propolis significantly enhanced the antibacterial property of SNAP. The combination of the elements had greater antibacterial effect than the individual components alone.

It should be noted that the presence of propolis greatly enhanced the antibacterial effect of SNAP. The combination of SNAP-Propolis showed 2 log reductions as opposed to SNAP-alone which showed around 1 log reduction bacterial reduction. Another published report has also recognized the antibacterial effect and wound healing potential of propolis in diabetic rats[5]. In the last decade propolis has garnered great interest in the cosmetic industry due to its antibacterial potential. Propolis has been incorporated into many products on the market such as Benton Aloe Propolis Soothing Gel, CNP Laboratory, and Burt's Bees®. It is also an active ingredient of oral gels (Y. S Eco Bees Farms, Swanson® Healthcare), oral sprays (Comvita®) and toothpaste (Tom's of Maine®) to name a few. However, the antibacterial activity of combined SNAP-Propolis was greater than the effect of propolis alone. Overall, the synergistic effect of SNAP-Propolis led to enhanced antibacterial effect as compared to just SNAP or propolis individually. These results also showed that the antibacterial effect is not altered even in the presence of highest concentration of TXA.

3.6 Cytotoxicity

Figure 7:
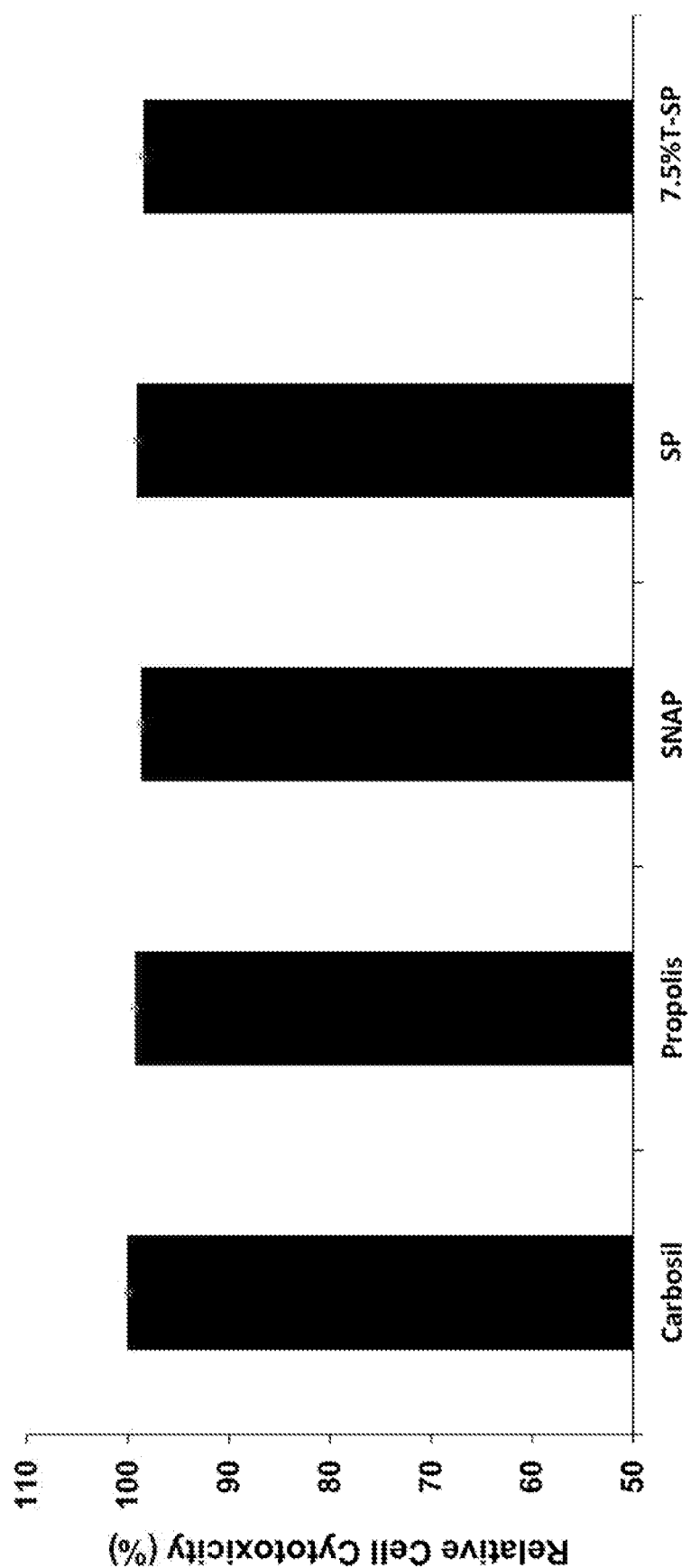
FIG. 7 shows WST-8 based cell viability assay showing non-cytotoxic nature of the dressing against mouse fibroblast cells showing the safety profile of the dressing.

Another major concern of this study was to induce instant healing and inhibit bacterial infection at the site of trauma wound injuries but not at the cost of a toxic effect to the otherwise healthy cells around the wounded tissue. To ensure that the components of wound dressing—CarboSil®, SNAP, TXA, and propolis—are not cytotoxic to the mammalian cells, a 24-hour cytotoxicity study was conducted on mouse fibroblast cells. The 24-hour period also ensures that, if needed, prolonged use of the wound dressings (e.g., due to delay in providing immediate hospital care) would still allow the wound to be clotted and protected against infection. As FIG. 7 shows, the relative cell viability was almost the same for different ingredients and the combination. SNAP-CarboSil® material at a higher concentration than the one used in the study has also shown to be non-cytotoxic to mouse fibroblast cells.[11-12] SNAP integration in other polymers such as Elasteon based materials have also shown evidence of both its hemocompatible and biocompatible nature in vitro.[27] NO-based strategy is not just antibacterial and non-cytotoxic but it has other wound healing attributes too. A recent study by Brisbois et al. suggested that NO releasing wound patches regulate the epithelization and TGF-$\beta$ in a burn wound mouse model.[28] Propolis is an FDA-approved naturally extracted honey bee glue that has been known to be taken orally and is also used in a variety of commercialized cosmetics for its antibacterial properties. Similarly, the concentration of TXA used in this study was within the range of recommended dose for topical and intravenous application.[15-16, 29] The results proved that the concentration of CarboSil®, SNAP, propolis, and TXA used are non-cytotoxic to mammalian cells while they ensure instant clotting and antibacterial effect.

Further, in vivo studies on animal models are planned for, and could provide more supporting evidence for the practical implications of the designed wound dressing.

4. Conclusion

Excessive blood loss during military combat, car accidents, gunshots and other emergency situations leads to millions of deaths worldwide. Most victims who suffer from trauma succumb to excessive bleeding before being transported to a medical facility for treatment. Open wounds are prone to infection, which increases the mortality rate, making the existing problem of blood loss worse. Hence, there is an urgent need for wound dressings that can not only provide an instant blood clot but also prevent infection. In the current study, an advanced wound dressing was made by combining SNAP, propolis, and TXA as therapeutic agents and using CarboSil® as the base material for wound dressings. The results suggested the wound dressing increased platelet adhesion in vitro while simultaneously increasing the fibrin network at the site of application, owing to its clot forming potential. It also resulted in killing more than 99% bacteria, which is a significant stride in the field of wound healing. The wound dressing also maintained a noncytotoxic response towards mammalian cells. Furthermore, NO possesses rapid action of NO, short half-life and non-specific antibacterial mechanism. Thus, the designed wound dressings provide an advantage over the current commercialized product which has issues of antibiotic resistance and cytotoxicity. From the application point of view, this is of great significance as most of the deaths in emergency situations are due to excessive bleeding and infection. These wound dressings thus provide first aid, preventing excessive blood loss and infection, and providing extra time before the patient can be hospitalized for the trauma treatment. Overall, this new class of wound dressing offers great commercialization potential.

Aspects

The following listing of exemplary aspects supports and is supported by the disclosure provided herein.

An aspect of the present disclosure provides for a wound dressing, having an environment-facing side and a wound-facing side; where the environment-facing side comprises a biocompatible material comprising a polymer crosslinked with an antimicrobial effective amount of a NO-donor; and where the wound-facing side comprises a biocompatible resinous matrix and an antifibrinolytic agent.

In some aspects, the NO-donor is selected from S-nitroso-N-acetylpenicillamine, S-Nitrosoglutathione, and combinations thereof.

In some aspects, the resinous matrix comprises propolis.

In some aspects, the antifibrinolytic agent comprises tranexamic acid.

In some aspects, the polymer is selected from a synthetic polymer or a natural polymer.

In some aspects, the synthetic polymer is thermoplastic silicone-polycarbonate-urethane.

In some aspects, the dressing promotes fibrin formation and rapid platelet aggregation when compared to a dressing that does not include the biocompatible resinous matrix and the antifibrinolytic agent, and has antimicrobial properties.

In some aspects, the resinous matrix has antibacterial properties.

An aspect of the present disclosure provides for a wound dressing, comprising a mixture of a resinous matrix and an antifibrinolytic agent formulated for application directly to a wound.

In some aspects, the wound dressing further comprises a biocompatible material comprising a polymer crosslinked with an antimicrobial effective amount of a NO-donor, wherein the biocompatible material covers the mixture to form a layer between the mixture and an external environment.

In some aspects, wherein the resinous matrix comprises propolis.

In some aspects, the NO-donor is selected from S-nitroso-N-acetylpenicillamine, S-Nitrosoglutathione, and combinations thereof.

In some aspects, the antifibrinolytic agent comprises tranexamic acid.

In some aspects, the polymer is selected from a synthetic polymer or a natural polymer.

In some aspects, the synthetic polymer is thermoplastic silicone-polycarbonate-urethane.

In some aspects, the dressing promotes fibrin formation and rapid platelet aggregation when compared to a dressing that does not include the biocompatible resinous matrix and the antifibrinolytic agent, and has antimicrobial properties.

An aspect of the present disclosure provides for a method of treating a wound, comprising applying a mixture of a resinous matrix and an antifibrinolytic agent applied directly to the wound, where the mixture promotes fibrin formation and rapid platelet aggregation when compared to a dressing that does not include the biocompatible resinous matrix and the antifibrinolytic agent, and has antimicrobial properties.

In some aspects, the method further comprises covering the mixture with a biocompatible material comprising a polymer crosslinked with an antimicrobial effective amount of a NO-donor, wherein the biocompatible material forms a layer between the mixture and an external environment.

In some aspects, the resinous matrix comprises propolis.

In some aspects, the NO-donor is selected from S-nitroso-N-acetylpenicillamine, S-Nitrosoglutathione, and combinations thereof.

In some aspects, the antifibrinolytic agent comprises tranexamic acid.

In some aspects, the polymer is selected from a synthetic polymer or a natural polymer.

In some aspects, the synthetic polymer is thermoplastic silicone-polycarbonate-urethane.

REFERENCES

1. Hoyt, D. B. In *A clinical review of bleeding dilemmas in trauma*, Seminars in hematology, Elsevier: 2004; pp 40-43.
2. Maegele, M., The coagulopathy of trauma. *European Journal of Trauma and Emergency Surgery* 2014, 40 (2), 113-126.
3. Binkowska, A. M.; Michalak, G.; Słotwiński, R., Current views on the mechanisms of immune responses to trauma and infection. *Central-European journal of immunology* 2015, 40 (2), 206.
4. Morgan, A. S., Risk factors for infection in the trauma patient. *Journal of the National Medical Association* 1992, 84 (12), 1019.
5. Hozzein, W. N.; Badr, G.; Al Ghamdi, A. A.; Sayed, A.; Al-Waili, N. S.; Garraud, O., Topical application of propolis enhances cutaneous wound healing by promoting TGF-beta/Smad-mediated collagen production in a streptozotocin-induced type I diabetic mouse model. *Cellular Physiology and Biochemistry* 2015, 37 (3), 940-954.
6. MELLO, C.; Petrus, J.; Hubinger, M., Nanofiltration of aqueous propolis extracts and the effects of temperature, pressure and ph in the concentrated product. *Stud Chem Technol (SCPT)* 2013, 1, 55-65.
7. Uzel, A.; Önçağ, Ö.; Çoğulu, D.; Gençay, Ö., Chemical compositions and antimicrobial activities of four different Anatolian propolis samples. *Microbiological research* 2005, 160 (2), 189-195.
8. Rahman, M. M.; Richardson, A.; Sofian-Azirun, M., Antibacterial activity of propolis and honey against *Staphylococcus aureus* and *Escherichia coli*. *African Journal of Microbiology Research* 2010, 4 (18), 1872-1878.
9. Grenho, L.; Barros, J.; Ferreira, C.; Santos, V.; Monteiro, F.; Ferraz, M.; Cortes, M., In vitro antimicrobial activity and biocompatibility of propolis containing nanohydroxyapatite. *Biomedical Materials* 2015, 10 (2), 025004.
10. Ker, K.; Beecher, D.; Roberts, I., Topical application of tranexamic acid for the reduction of bleeding. *Cochrane Database Syst Rev* 2013, 7.
11. Pant, J.; Goudie, M. J.; Chaji, S. M.; Johnson, B. W.; Handa, H., Nitric oxide releasing vascular catheters for eradicating bacterial infection. *Journal of Biomedical Materials Research Part B: Applied Biomaterials*.
12. Pant, J.; Goudie, M. J.; Hopkins, S. P.; Brisbois, E. J.; Handa, H., Tunable Nitric Oxide Release from S-Nitroso-N-acetylpenicillamine via Catalytic Copper Nanoparticles for Biomedical Applications. *ACS Appl. Mater. Interfaces* 2017, 9 (18), 15254-15264.
13. Pant, J.; Goudie, M.; Brisbois, E.; Handa, H., Nitric oxide-releasing polyurethanes. *Advances in Polyurethane Biomaterials* 2016, 417.
14. Pant, J.; Gao, J.; Goudie, M. J.; Hopkins, S.; Locklin, J.; Handa, H., A Multi-defense Strategy: Enhancing Bactericidal Activity of a Medical Grade Polymer with a Nitric Oxide Donor and Surface-immobilized Quaternary Ammonium Compound. *Acta Biomater.* 2017.
15. Hosseini, S. H. R. J.; Khalili, M. R.; Motallebi, M., Comparison between topical and oral tranexamic acid in management of traumatic hyphema. *Iranian journal of medical sciences* 2014, 39 (2 Suppl), 178.
16. Chang, C.-H.; Chang, Y.; Chen, D. W.; Ueng, S. W.; Lee, M. S., Topical tranexamic acid reduces blood loss and transfusion rates associated with primary total hip arthroplasty. *Clinical Orthopaedics and Related Research®* 2014, 472 (5), 1552-1557.
17. Lam, M. S., Extemporaneous compounding of oral liquid dosage formulations and alternative drug delivery methods for anticancer drugs. *Pharmacotherapy: The Journal of Human Pharmacology and Drug Therapy* 2011, 31 (2), 164-192.

18. Gu, H.; Chen, X.; Yu, Q.; Liu, X.; Zhan, W.; Chen, H.; Brash, J. L., A multifunctional surface for blood contact with fibrinolytic activity, ability to promote endothelial cell adhesion and inhibit smooth muscle cell adhesion. *J. Mater. Chem. B* 2017, 5 (3), 604-611.
19. Li, C.; Du, H.; Yang, A.; Jiang, S.; Li, Z.; Li, D.; Brash, J. L.; Chen, H., Thrombosis-Responsive Thrombolytic Coating Based on Thrombin-Degradable Tissue Plasminogen Activator (t-PA) Nanocapsules. *Advanced Functional Materials* 2017, 27 (45).
20. Golebiewska, E. M.; Poole, A. W., Platelet secretion: From haemostasis to wound healing and beyond. *Blood Rev.* 2015, 29 (3), 153-162.
21. Laurens, N.; Koolwijk, P.; De Maat, M., Fibrin structure and wound healing. *J. Thromb. Haemost.* 2006, 4 (5), 932-939.
22. Roberts, I.; Shakur, H.; Coats, T.; Hunt, B.; Balogun, E.; Barnetson, L.; Cook, L.; Kawahara, T.; Perel, P.; Prieto-Merino, D., The CRASH-2 trial: a randomised controlled trial and economic evaluation of the effects of tranexamic acid on death, vascular occlusive events and transfusion requirement in bleeding trauma patients. *Health technology assessment (Winchester, England)* 2013, 17 (10), 1.
23. Boling, B.; Moore, K., Tranexamic acid (TXA) use in trauma. *Journal of Emergency Nursing* 2012, 38 (5), 496-497.
24. Jones, A.; Pant, J.; Lee, E.; Goudie, M. J.; Gruzd, A.; Mansfield, J.; Mandal, A.; Sharma, S.; Handa, H., Nitric oxide-releasing antibacterial albumin plastic for biomedical applications. *Journal of Biomedical Materials Research Part A*.
25. Grommersch, B. M.; Pant, J.; Hopkins, S. P.; Goudie, M. J.; Handa, H., Biotemplated Synthesis and Characterization of Mesoporous Nitric Oxide-Releasing Diatomaceous Earth Silica Particles. *ACS Appl. Mater. Interfaces* 2018, 10 (3), 2291-2301.
26. Sundaram, J.; Pant, J.; Goudie, M. J.; Mani, S.; Handa, H., Antimicrobial and physicochemical characterization of biodegradable, nitric oxide-releasing nanocellulose—chitosan packaging membranes. *J. Agric. Food Chem.* 2016, 64 (25), 5260-5266.
27. Goudie, M. J.; Brisbois, E. J.; Pant, J.; Thompson, A.; Potkay, J. A.; Handa, H., Characterization of an S-nitroso-N-acetylpenicillamine-based nitric oxide releasing polymer from a translational perspective. *Int. J. Polym. Mater. Polym. Biomater.* 2016, 65 (15), 769-778.
28. Brisbois, E. J.; Bayliss, J.; Wu, J.; Major, T. C.; Xi, C.; Wang, S. C.; Bartlett, R. H.; Handa, H.; Meyerhoff, M. E., Optimized polymeric film-based nitric oxide delivery inhibits bacterial growth in a mouse burn wound model. *Acta Biomater.* 2014, 10 (10), 4136-4142.
29. Zahed, R.; Moharamzadeh, P.; Alizadeh Arasi, S.; Ghasemi, A.; Saeedi, M., A new and rapid method for epistaxis treatment using injectable form of tranexamic acid topically: a randomized controlled trial. *The American journal of emergency medicine* 2013, 31 (9), 1389-1392.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A wound dressing comprising
   a first layer comprising a biocompatible material comprising a polymer and an antimicrobial effective amount of a NO-donor, wherein the NO-donor consists of S-nitroso-N-acetylpenicillamine, S-nitrosocysteamine, S-nitrosocysteine, S-nitroso-N-acetyl cysteamine, S-nitroso-N-acetyl cysteine, S-nitrosothioglycolate methyl S-nitrosothioglycolate, S-nitrosoglutathione, or sodium nitroprusside;
   a second layer comprising a biocompatible resinous matrix and an antifibrinolytic agent; and
   where the first layer is adjacent to the second.
2. The wound dressing of claim 1, wherein the NO-donor is S-nitroso-N-acetylpenicillamine.
3. The wound dressing of claim 1, wherein the resinous matrix comprises propolis.
4. The wound dressing of claim 1, wherein the antifibrinolytic agent comprises tranexamic acid or aminocaproic acid.
5. The wound dressing of claim 1, wherein the polymer is selected from a synthetic polymer or a natural polymer.
6. The wound dressing of claim 1, wherein the dressing promotes fibrin formation and rapid platelet aggregation when compared to a dressing that does not include the biocompatible resinous matrix and the antifibrinolytic agent, and has antimicrobial properties.
7. The wound dressing of claim 1, wherein the resinous matrix has antibacterial properties.
8. A method of treating a wound, comprising:
   applying the wound dressing of claim 1 to the wound, where the second layer of the wound dressing is in contact with the wound.
9. An article comprising the wound dressing material of claim 1.
10. The article of claim 9, wherein the article is selected from the group consisting of an absorbent dressing, a wound filler or packing, a hydrogel or silicon sheet, a bandage, or a foam.

* * * * *